United States Patent
Sartre et al.

(10) Patent No.: US 11,519,367 B2
(45) Date of Patent: Dec. 6, 2022

(54) CHARGE AIR COOLER FOR FUEL ENGINE

(71) Applicant: VOLVO TRUCK CORPORATION, Gothenburg (SE)

(72) Inventors: Vincent Sartre, Bron (FR); Sylvain Lallich, Sainte-Foy-lès-Lyon (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/345,777

(22) Filed: Jun. 11, 2021

(65) Prior Publication Data
US 2021/0388799 A1    Dec. 16, 2021

(30) Foreign Application Priority Data

Jun. 16, 2020  (EP) .................................... 20180317

(51) Int. Cl.
*F02M 31/20* (2006.01)
*F02M 35/08* (2006.01)
(Continued)

(52) U.S. Cl.
CPC ......... *F02M 31/20* (2013.01); *F02B 29/0468* (2013.01); *F02M 35/088* (2013.01);
(Continued)

(58) Field of Classification Search
CPC ..... F02M 31/20; F02M 35/088; F28F 17/005; F28F 2265/22; F28F 2255/04;
(Continued)

(56) References Cited

U.S. PATENT DOCUMENTS 2,636,776 A * 4/1953 Vernet .................. G05D 23/022
                                                    60/527
2012/0055151 A1    3/2012 Durand et al.
(Continued)

FOREIGN PATENT DOCUMENTS

| JP | 61105382 A | * | 5/1986 | ........... F16K 31/002 |
| KR | 20130119654 A | * | 11/2013 | ........... F16K 31/002 |
| WO | 2007069972 A1 | | 6/2007 | |

OTHER PUBLICATIONS

English machine translation provided by ESPACENET for KR-20130119654-A (Year: 2021).*
(Continued)

*Primary Examiner* — Michael A Kessler
(74) *Attorney, Agent, or Firm* — Venable LLP; Jeffri A. Kaminski

(57) ABSTRACT

The invention relates to a charge air cooler (5) for fuel engine comprising:
  a casing having an inlet (16) and an outlet (20),
  a heat exchanger (10) within the casing between the inlet (16) and the outlet (20),
  a thermally responsive draining mechanism (50, 60) for draining condensates,
    the draining mechanism (50, 60) being configured to drain condensates when temperature within the charge air cooler (5) is below a defined temperature,
  draining mechanism comprising a drain port (58, 68),
  a valve (51, 61, 52, 62, 53, 63) arranged on the drain port (58, 68),
    an actuation device (53, 63, 64) for moving the valve between an opened state and a closed state,
  wherein the actuation device includes a phase change material.

10 Claims, 2 Drawing Sheets

(51) Int. Cl.
*F02B 29/04* (2006.01)
*F03G 7/06* (2006.01)
*F28D 21/00* (2006.01)
*F28F 17/00* (2006.01)

(52) U.S. Cl.
CPC .. *F03G 7/06113* (2021.08); *F28D 2021/0082* (2013.01); *F28F 17/005* (2013.01); *F28F 2255/04* (2013.01)

(58) Field of Classification Search
CPC ......... F28D 2021/0082; F02B 29/0468; F16K 31/002; F16K 31/12; Y10T 137/1353; F01P 11/0276; F01P 2070/02
See application file for complete search history.

(56) References Cited

U.S. PATENT DOCUMENTS

2015/0285128 A1   10/2015  Cardwell et al.
2020/0191047 A1*  6/2020  Goncalves .......... F02B 29/0468
2020/0408137 A1* 12/2020  Jeong ................. F02B 29/0406

OTHER PUBLICATIONS

European Search Report dated Nov. 27, 2020 in corresponding European Patent Application No. 20180317.8, 5 pages.

\* cited by examiner

CHARGE AIR COOLER FOR FUEL ENGINE

TECHNICAL FIELD

The present invention relates to a charge air cooler comprising a drain arrangement for draining condensed matter from the internal space of the charge air cooler. The drain arrangement comprises an opening in a bottom portion of the charge air cooler, wherein at least one member is positioned to open and close said opening.

The invention can be applied in any motorized vehicle and for example in heavy-duty vehicles, such as trucks, buses and construction equipment.

Further, the invention is applicable on working machines within the fields of industrial construction machines or construction equipment. Although the invention will be described with respect to a wheel loader, the invention is not restricted to this particular machine, but may also be used in other working machines such as articulated haulers, excavators and backhoe loaders.

BACKGROUND

For turbocharged piston engines, it has more or less become industry standard to provide a charge air cooler between the turbocharger and the intake of the engine. A charge air cooler cools the compressed, hot air from the turbocharger prior to engine inlet entrance. By this cooling, some important advantages, which per se are well known by persons skilled in the art, are achieved. For example, the engine will attain higher power, reduced fuel consumption and reduced emissions.

There are however some problems connected to the use of charge air coolers, the perhaps most severe problem being that water vapour in the compressed air is likely to condense in the charge air cooler. The condensed water will descend to a bottom portion of the charge air cooler, where it might block the path of the air flowing through the charge air cooler.

The problem with condensed water is even more serious during winter periods in areas where freezing temperatures occur. In freezing temperatures, the condensed water in the charge air cooler may freeze to ice. As is well known, ice tends to expand as compared to water this expansion might ruin confined spaces where the freezing occurs, e.g. the charge air cooler tubes or tank. Furthermore, the ice might block the air path leading from the turbocharger to the engine. As can be understood, the engines running conditions will be severely disturbed if the airflow about to enter the engine is disturbed. To avoid condensed water from gathering in charge air coolers, it is common to drill a small (diameter 1-10 mm) hole in a bottom portion of the charge air cooler. This hole will allow drainage of water from the charge air cooler, hence avoiding said problem with gathering of water. The provision of a hole is however disadvantageous from several points of view. Firstly, the hole will allow not only water, but also compressed air, to escape the charge air cooler. As can be understood, allowing compressed air to escape the charge air cooler contravenes the basic idea with the charge air cooler, namely to let in a larger air mass through the engine intake. Secondly, there is a major risk that a small hole gets blocked, which of course takes us back to point one, namely the problem with condensed water or ice blocking or ruining the charge air cooler. Thirdly, there are engine-running condition where the pressure in the charge air cooler is lower than the ambient pressure. Under such conditions, air will be drawn into the charge air cooler through the small hole. The air passing into the charge air cooler through the small hole has not been filtered, which is the case for other intake air, which increases the risk of dirt or abrasive materials being allowed to enter the engine's sensitive combustion areas.

Hence, the aim of the present invention is to present a drainage solution that can be used for all markets, that provides a sufficient drainage, reduces the risk of blocking, has a limited risk of sticking in an open or closed position, drains all present water and does not inflict compressed air leakage.

SUMMARY

An object of the invention is to provide a simple and passive drain mechanism for charger air cooler, which is very simple as comprising a minimum of component and passive means not electronically nor electrically control.

The object is achieved by a charge air cooler for fuel engine comprising:
 a casing having an inlet and an outlet,
 a heat exchanger within the casing between the inlet and the outlet,
 a thermally responsive draining mechanism for draining condensates,
 the draining mechanism being configured to drain condensates when temperature within the charge air cooler is below a defined temperature,
 draining mechanism comprising a drain port,
 a valve arranged on the drain port,
 an actuation device for moving the valve between an opened state and a closed state,
wherein the actuation device includes a phase change material.

Using a phase change material for modifying the state of the valve is simple and cheap solution. No electronic nor sensor is needed.

According to one embodiment, the actuation device is in an opened state when the phase change material is a first phase and in a closed state when the phase change material is in a second phase, that change phase of the material is at a temperature above 1°.

Choose a positive changing phase temperature avoids icing inside the air charger cooler According to one embodiment, the first phase of the change phase material is liquid, that second phase of the change phase material is gaseous.

According to one embodiment, the first phase of the change phase material is liquid, that second phase of the change phase material is solid.

According to one embodiment, the actuation device comprises a rod, pushed in the opened state by a spring element, and a deformable container filled with the change phase material that pushed the rod in closed state when the change phase material is in the second phase.

According to one embodiment, the actuation device comprises a piston mounted between the rod and the deformable container and configured to push the rod in the closed state when the change phase material is in the second phase.

According to one embodiment, the deformable container comprises a capsule linked with a diaphragm by a tube, the diaphragm is configured to push the rod in closed position when the change phase material is in the second phase.

According to one embodiment, the capsule is assembled in a hot area of the heat exchanger.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
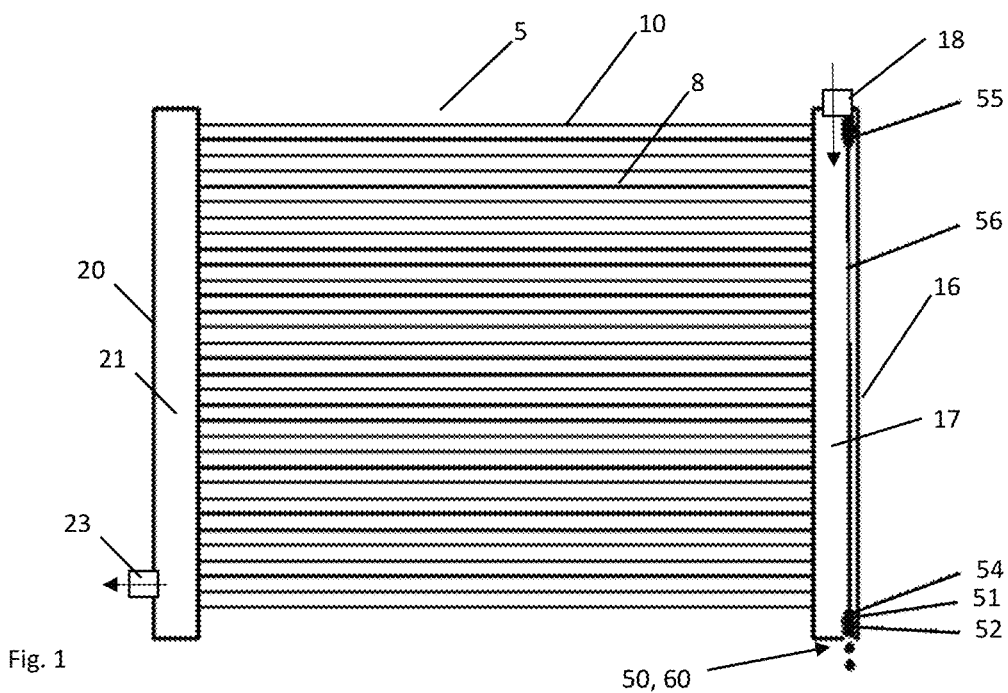
FIG. 1 is a front view a charge air cooler having a drain mechanism according to a first embodiment integrated.

FIG. 1 illustrates a charge air cooler 5 comprising a heat exchanger core 10 disposed between an inlet tank 16 and an outlet tank 20. The inlet tank 16 includes a hollow interior 17 and a fluid inlet 18 providing fluid communication between the hollow interior 17 of the inlet tank 16 and a turbocharger (not shown) disposed upstream of the inlet tank 16 and used to compress (and hence heat) intake air before the intake air enters the charge air cooler 5. The inlet tank 16 may include at least one fluid outlet (not shown) providing fluid communication between the hollow interior 17 of the inlet tank 16. The inlet tank may include a plurality of passages (not shown) formed therein for distributing the charge air to a plurality of heat exchanger tubes 8.

The plurality of heat exchanger tubes 8 extends from the inlet tank to the outlet tank 20 disposed at an opposite end of the heat exchanger core 10. In similar fashion, the outlet tank may also include a plurality of passages (not shown) corresponding to the plurality of heat exchanger tubes 8 for recombining the charge air as it enters the outlet tank 20. The plurality of heat exchanger tubes 8 may be spaced apart to allow a second cooling fluid to flow there between. It should be understood that the second cooling fluid might be any fluid having a temperature lower than the intake air flowing through the plurality of heat exchanger tubes. The second cooling fluid may for instance be ambient air, recirculation air, water, or any other cooling fluid circulating through any system of an automobile having the charge air cooler 5. A plurality of corrugated fins (not showed) or other surface area increasing structures may be formed on an exterior surface of each of the plurality of heat exchanger tubes 8 to facilitate heat transfer between the charge air flowing through the plurality of heat exchanger tubes 8 and the second cooling fluid flowing between the plurality of heat exchanger tubes 8.

The outlet tank 20 may include at least one fluid inlet (not shown) formed therein providing fluid communication between the plurality of passages formed in the outlet tank 20 and a hollow interior 21 of the outlet tank 20. The outlet tank 20 also includes at least one fluid outlet 23 formed therein providing fluid communication between the hollow interior 21 of the outlet tank 20 and an intake portion of an engine (not shown).

Figure 2:
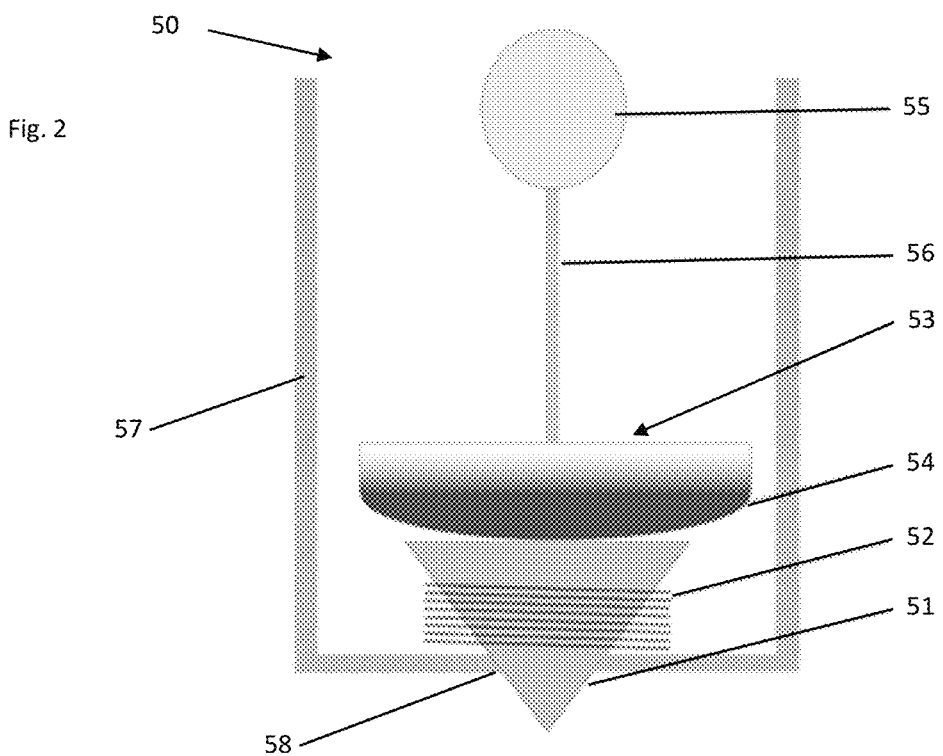
FIG. 2 is a cross-sectional front elevation view of a first embodiment of the drain mechanism in a close position

The inlet tank 16 also includes a drain mechanism 50, 60 disposed in a lowermost region of the hollow interior 17 thereof with respect to gravity. The drain mechanism may alternatively disposed in a lowermost region of the hollow interior 21 of the outlet tank thereof with respect to gravity According to a first embodiment illustrated at FIG. 2, the drain mechanism 50 comprises a drain port 58 allowing condensates to fall out the charge air cooler 5. The drain mechanism 50 also comprises a rod 51 pushed through the drain port 58 in an opened state by a spring element 52. The rod 51 may have a first end in a conical shape to close hermetically the drain port 58. Rod 51 and spring element 52 form a valve to open or close drain port 58.

The drain mechanism 50 comprises an actuation device comprising a deformable container 53 filled with a change phase material. When changing phase the volume of the change phase material increases or decreases and modifies the shape of the deformable container. The deformable container 53 comprises a first portion 54 mounted close to one end of the rod 55. This first portion 54 is configured to push the rod 51 in a closed state of the drain port 58 when the volume of the first portion 53 increases due to phase changing.

The drain mechanism 50 comprise a capsule 55 linked to the first portion 54 by a tube 56. The change phase material fills the interior volume of the first portion 54, the capsule 55 and the tube 56. According to the invention, in a first phase of the change phase material, the rod 51 is in a closed state of the drain port 58, and in the second phase of the change phase material the rod 51 is in an opened state of the drain port 58. Then, the change phase material is chosen to increase in volume when phase change from second one to the first one.

As an example, the change phase materiel is in liquid form in the second phase and in gaseous form in the first phase. Then, when changing from liquid to gaseous phase, the volume of the phase change material increases. Therefore, the first portion 54 of the drain mechanism 53 inflates and push the rod 51 in closed state.

The changing phase temperature is chosen in view to put the drain mechanism in closed state when the charge air cooler is in function. "In function" means the engine is started and hot air to be cooled flows through the charge air cooler 5. The changing phase temperature should be at minimum above 0°. This will guaranties that the drain mechanism will be always at an opened stated when the ambient temperature would be below 0° and then avoid formation of ice inside the charge air cooler. As an example, the changing phase temperature is comprised between 1° to 50°.

Figure 3:
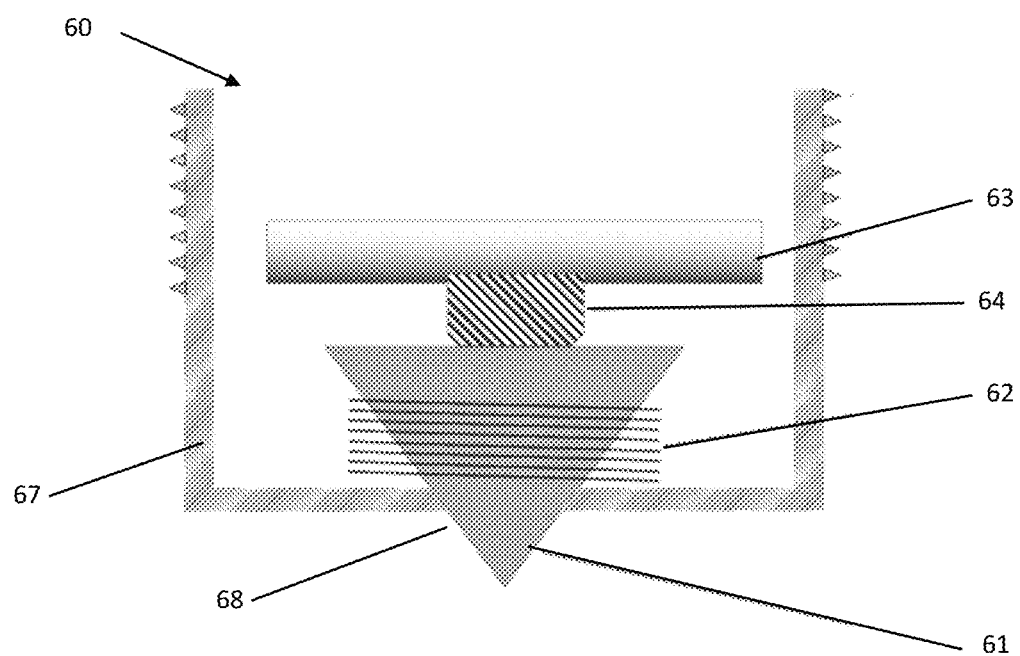
FIG. 3 is a cross-sectional front elevation view of a second embodiment of the drain mechanism in a close position

According to the first embodiment, the capsule 55 is mounted near the fluid inlet 18, which is the hottest part of the charge air cooler 5. The tube 56 is mounted along the hollow interior 17 of the inlet tank 16. The drain mechanism may comprise a housing 57, 67 containing at least the rod 51, the spring element 52, the drain port 58 and the first portion 54. The housing is then, for example, screw on the charge air cooler FIG. 3 illustrates a second embodiment of a drain mechanism 60 according to the invention. This second embodiment also comprises a rod 61, a spring element 62 and a drain port 68 having the same configuration than for the first embodiment described above. The actuation device comprise a deformable container 63 fill with a change phase material. The deformable container is configured to push the rod 61 against the drain port when the first phase of the change material is in liquid phase. The second phase of the change material is solid. The actuation device of the drain mechanism could comprise a piston 64 mounted between the rode 61 and the deformable container 63.

The change phase material could be a paraffin like material. Using such kind of material, volume expansion due to phase change is above 10%. When hot gas from turbo outlet enter the charge air cooler 5, it heats up the paraffin. When paraffin melts, the volume expansion push a piston that close the drain port 58. When paraffin become solid, a spring element 62 push the rod 61 and the piston 64 in the opened state.

The spring element 52, 62 could be a helicoidal spring or an elastic material or any equivalent material.

It is to be understood that the present invention is not limited to the embodiments described above and illustrated in the drawings; rather, the skilled person will recognize that many changes and modifications may be made within the scope of the appended claims.

The invention claimed is:

1. A charge air cooler for a fuel engine comprising:
   a casing having an inlet and an outlet,
   a heat exchanger within the casing between the inlet and the outlet,
   a thermally responsive draining mechanism for draining condensates,
   the draining mechanism being configured to drain condensates when a temperature within the charge air cooler is below a defined temperature,
   the draining mechanism comprising a drain port,
   a valve arranged on the drain port,
   an actuation device for moving the valve between an opened state and a closed state,
   wherein the actuation device includes a phase change material,
   wherein the valve is in the opened state when the phase change material is a first phase and the valve is in the closed state when the phase change material is in a second phase, and wherein the phase change material changes phase at a temperature above 1° Celsius,
   wherein the actuation device comprises a spring element, biasing the valve toward the opened state, and a deformable container filled with the phase change material that pushes the valve to the closed state when the phase change material is in the second phase,
   wherein the deformable container comprises a capsule linked with a diaphragm by a tube, the diaphragm is configured to push the valve to the closed state when the phase change material is in the second phase.

2. The charge air cooler according to claim 1, wherein first phase of the phase change material is liquid, that second phase of the phase change material is gaseous.

3. The charge air cooler according to claim 1, wherein the first phase of the phase change material is liquid, that second phase of the phase change material is solid.

4. The charge air cooler according to claim 1, wherein the actuation device comprises a piston mounted between the rod and the deformable container and configured to push the rod in the closed state when the phase change material is in the second phase.

5. The charge air cooler according to claim 1, wherein the capsule is assembled in a hot area of the heat exchanger.

6. The charge air cooler according to claim 1, wherein the capsule is arranged near the inlet.

7. A charge air cooler for a fuel engine comprising:
   a casing having an inlet and an outlet,
   a heat exchanger within the casing between the inlet and the outlet,
   a thermally responsive draining mechanism for draining condensates,
   the draining mechanism being configured to drain condensates when temperature within the charge air cooler is below a defined temperature, the draining mechanism comprising a drain port,
   a valve arranged on the drain port, at a lowermost region of the casing,
   an actuation device for moving the valve between an opened state and a closed state,
   wherein the actuation device includes a phase change material,
   wherein the actuation device comprises a heat sensitive portion arranged near the inlet of the charge air cooler, away from the lowermost region of the casing.

8. The charge air cooler according to claim 7, wherein the valve is in the opened state when the phase change material is a first phase and in the closed state when the phase change material is in a second phase, and wherein the phase change material changes phase at a temperature above 1° Celsius.

9. The charge air cooler according to claim 7, wherein the actuation device comprises a spring element, biasing the valve toward the opened state, and a deformable container filled with the phase change material that pushes the valve to the closed state when the phase change material is in the second phase.

10. The charge air cooler according to claim 7, wherein the first phase of the phase change material is liquid, that second phase of the phase change material is gaseous.

* * * * *